UNITED STATES PATENT OFFICE.

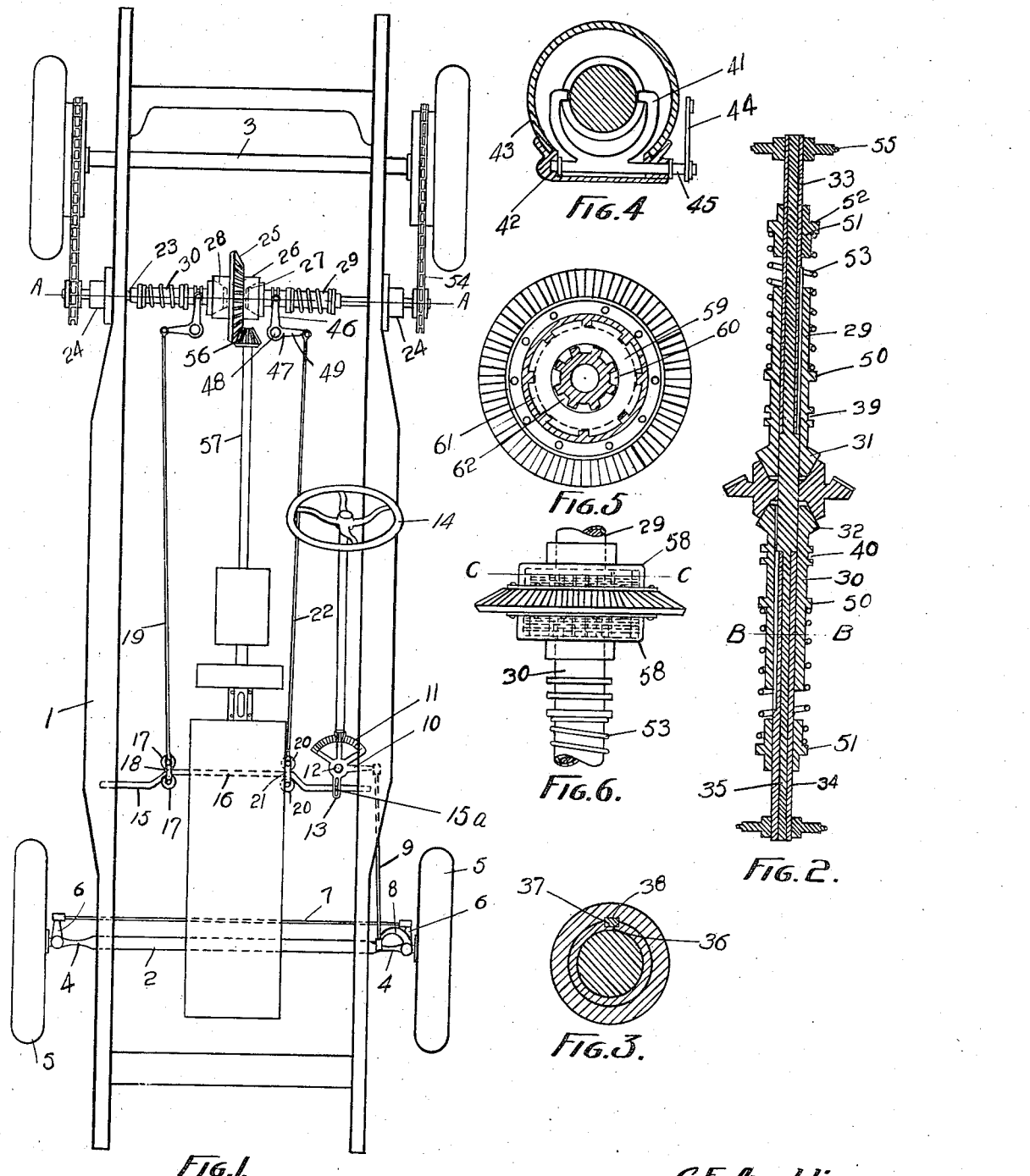

CHARLES EDWARD ARNOLDI, OF TORONTO, ONTARIO, CANADA.

MOTOR-CAR DRIVING MECHANISM.

1,175,917.　　　　　Specification of Letters Patent.　　Patented Mar. 21, 1916.

Application filed February 26, 1915. Serial No. 10,756.

*To all whom it may concern:*

Be it known that I, CHARLES EDWARD ARNOLDI, a subject of the King of Great Britain, and resident of 136 Spadina road, in the city of Toronto, county of York, Province of Ontario, in the Dominion of Canada, have invented certain new and useful Improvements in Motor-Car Driving Mechanism, of which the following is a specification.

The invention relates to improvements in motor car driving mechanism as described in the present specification and shown in the accompanying drawings that form part of the same.

The invention consists essentially of the novel construction and arrangement of parts, whereby one or other of the rear driving wheels, as the case may be, is affected by the operation of the steering mechanism coincidently and correspondingly with the movement of the latter.

The objects of the invention are to facilitate the communication of driving power to both rear wheels simultaneously, to facilitate the turning of the vehicle and generally to provide a motor car driving mechanism which will be simple of construction, cheap to manufacture, durable and efficient.

In the drawings, Figure 1 is a plan view of a motor car chassis showing the invention applied to the jack shaft of a chain driven vehicle. Fig. 2 is a sectional view through the jack shaft on the line A—A of Fig. 1. Fig. 3 is a cross sectional view of the jack shaft on the line B—B of Fig. 2. Fig. 4 is a sectional view of the jack shaft showing the mechanism employed to make and break the connection between the driving mechanism and the wheels. Fig. 5 is a view in elevation of a modified form of clutch which may be used in this invention. Fig. 6 is a plan view of the shaft and clutch member of the modified form of clutch mechanism illustrated in Fig. 5.

Like numerals of reference indicate corresponding parts in each figure.

Referring to the drawings, 1 is the frame of the chassis having secured thereto the front axle 2 and rear axle 3, the said front axle having at each end thereof the forked members 4 to which are attached the wheels 5 as customary.

6 are arms rigidly secured to the supporting members 4 and being connected together by the transverse bar 7.

8 is a curved lever arm pivotally secured to one of the members 4 and having its inner end secured to a rod 9 which at its other end is secured to the lever arm 10 of the sector 11, the said sector 11 being centrally pivoted at 12 and having on the forward side thereof the slotted lug 13.

14 is the steering wheel which is suitably secured to the sector 11 and adapted to impart movement thereto.

15 is a transverse bar centrally offset at 16 and slidably mounted on the frame 1 adjacent to the sector 11 and having the pin 15$^a$ securely fastened thereto adjacent to one end thereof and adapted to engage the slot in the lug 13.

17 are rollers located one on each side of the bar 15 adjacent to one end of the offset 16 and being journaled in bearings in the forked end 18 of the rearwardly extending rod 19.

20 are rollers one on each side of the bar 15 at the other end of the offset 16 and being journaled in bearings in the forked end 21 of the rearwardly extending rod 22 similarly to the roller 17.

It will thus be seen that any movement of the sector causing the slightest deviation from a straight line in regard to the direction of the vehicle will be communicated to the bar 15 through the pin 15$^a$ operating in the slotted lug 13, and as a consequence the bar 15 will be moved toward the side on which the turn is made drawing one or other of the sets of rollers forward and causing a forward pull on the rods 19 or 22 as the case may be.

23 is a jack shaft journaled in suitable bearings 24 in the frame 1 at a point to the front of the rear axle 3 and having in the center thereof the bevel gear 25, said bevel gear having extending from each side thereof the flanges 26 forming the cone shaped cups 27 and 28.

29 and 30 are sleeves slidably mounted on the shaft 23 one on each side of the bevel gear 25 and having the enlarged cone shaped inner ends 31 and 32 adapted to engage the cone shaped cups 27 and 28 respectively.

33 and 34 are hollow shafts mounted on the central shaft 35, said hollow shaft having in the outer wall thereof the groove or keyway 36 adapted to engage the key 37.

38 is a groove on the inner wall of the sleeves 29 and 30 adapted to fit over the key 37 in such a manner as to allow said sleeves to slide freely in a transverse motion but also to produce the simultaneous revolving of said hollow shafts 33 and 34 with the sleeves 29 and 30.

39 and 40 are grooves in the sleeves 29 and 30 adjacent to the inner ends thereof and adapted to be engaged by the forked shaped members 41 adjustably mounted in the bearings 42 of the casing 43, one of said brackets being secured at each side of the bevel gear 25 to the frame 1 adjacent to the shaft 23.

44 is a lever arm having one of its ends secured to a protruding member 45 and its other end pivotally secured to the arm 46 of the bell crank 47, said bell crank being centrally pivoted at 48 and having its other arm 49 pivotally secured to the rods 19 and 22 respectively.

50 are shoulders on the sleeves 29 and 30 respectively intermediate of the length thereof.

51 are collars fixedly mounted on the shafts 33 and 34 adjacent to the frame 1 and having thereon the shoulders 52, said shoulders forming with the aforesaid shoulders 50 a container for the helical springs 53 surrounding the shafts 33 and 34, the said spring being normally in compression and forcing the cone shaped ends of the sleeves 29 and 30 into the cups 27 and 28 respectively and consequently imparting power to each of the rear wheels of the vehicle, each of said wheels being connected to the shaft 23 by the sprocket chains 54 operating on the sprocket wheels 55.

It will thus be seen that when a substantial deviation from a straight line is made the rod 19 or rod 22, whichever may be on the side on which the turn is to be made, will be drawn forward as explained above and this will draw down the corresponding lever arm of the bell crank, which in turn will force the cone shaped end of the sleeve 29 or 30, as the case may be, out of engagement with the corresponding cup and thus cause the inner rear wheel to become an idle wheel and simply to rotate on its axis while the power is imparted to the outer wheel. When the turn has been made and the transverse bar 15 has returned to its normal position the conical end of the sleeve is again forced into engagement with the corresponding cup by means of the helical spring and both wheels again become driving wheels.

56 is a bevel gear supported on the shaft 57 and meshing with the bevel gear 25, the said shaft at its other end communicating with the transmission mechanism as customary.

In Figs. 5 and 6 a form of clutch is shown which may be used in place of the cone shaped members described above. 58 are disk drums secured to the bevel gear 25, one on each side thereof and containing the alternate disks 59 and 60 as customary, said disks having the outwardly and inwardly projecting members 61 and 62 respectively and being alternately connected to the drum 58 and to the sleeves 29 and 30. In the operation of this clutch the helical spring forces the disks together and imparts power to both wheels while in the turning movement the disks are forced apart and allow a free motion to the bevel gear.

The parts are here described in detail as particularly pertaining to this invention but it must be understood that many alterations may be made so long as the construction is kept within the scope of the claims for novelty.

What I claim is:

1. In a motor car driving mechanism, an axle, wheels mounted at the ends of said axle, a steering mechanism, a gear shaft, a driven gear wheel freely turning on said shaft, clutch members mounted on said shaft and connected to said wheels, said clutches being at each side of said gear and normally held in operating connection therewith, a transverse slidable bar operatively connected with said steering mechanism and rods connected with said bar and reciprocated in alternate movements and arranged to release said clutches individually according to the direction of the turn.

2. In a motor car driving mechanism, an axle, wheels mounted at the ends of said axle, a steering mechanism, a driven gear wheel, a gear shaft, clutch members at each side of said gear and normally connecting said wheels and gear for driving purposes, sleeve shafts rotating with said clutches on said gear shaft and operatively connected with said wheels, a bent transverse bar reciprocated by said steering mechanism and connecting members between said clutch members and said bent bar for releasing said clutches individually and coincidently with a right or left turn of the vehicle.

3. In a motor car driving mechanism, a manually operated steering member, a finger operated by said member, a bent transverse bar moved to and fro crosswise of the vehicle by said finger, crank levers operatively connected to said bar, clutches connected with said cranks and a driven gear engaged by said clutches.

4. In a device of the class described, a steering mechanism, a finger operated by said steering mechanism, a member slidably supported and moving to and fro crosswise of the vehicle and operatively connected with said finger, a driven gear wheel, clutch members engaging said gear and connecting rods reciprocated in separate and distinct movements alternately according to the direction of the turn.

5. In a device of the class described, a running gear having front and rear axles and wheels, a steering mechanism affecting the two front wheels, a driven gear wheel affecting the two rear wheels, a transverse slidable member formed to reciprocate longitudinal members and clutch members engaging said gear wheel, clutch releasing levers and rods forming said longitudinal members and extending to said steering mechanism and operable to release said clutch members separately and coincidently with the operation of the steering mechanism.

6. In a device of the class described, a running gear having front and rear wheels and axles, a gear shaft, sleeve shafts on said gear shaft and operatively connected with said rear wheels, clutch members mounted on said sleeve shafts, a driven gear wheel, clutch members connected with said gear wheel and engaged by the aforesaid clutch members, bell cranks connected with the last mentioned clutch members, connecting rods pivotally secured to said bell cranks, a slidable rod engaging said connecting rod and having an offset portion, a manually operated steering member, a sector operated thereby and having a finger therefrom engaging said slidable rod and means operatively connecting said sector and front wheels.

Signed at the city of Toronto, this 26th day of October 1914.

CHARLES EDWARD ARNOLDI.

Witnesses:
  W. G. HAMMOND,
  R. POUND.